United States Patent [19]

Schawlow et al.

[11] 4,052,129

[45] Oct. 4, 1977

[54] METHOD OF AND APPARATUS FOR MEASURING THE WAVELENGTH OF A SOURCE OF RADIANT ENERGY

[75] Inventors: Arthur L. Schawlow; Frank V. Kowalski, both of Stanford, Calif.

[73] Assignee: Board of Trustees of Leland Stanford Junior University, Stanford, Calif.

[21] Appl. No.: 712,934

[22] Filed: Aug. 9, 1976

[51] Int. Cl.² .................................................. G01B 9/02
[52] U.S. Cl. .................................. 356/106 R; 356/113
[58] Field of Search ............ 356/106 R, 106 LR, 113

[56] References Cited

U.S. PATENT DOCUMENTS 3,647,302  3/1972  Zipin et al. ...................... 356/106 R

OTHER PUBLICATIONS

Born et al., *Principles of Optics*, Pergamon Press, New York, pp. 337-340, 1959.

*Primary Examiner*—John K. Corbin
*Assistant Examiner*—Matthew W. Koren
*Attorney, Agent, or Firm*—Paul B. Fihe

[57] ABSTRACT

A method of and apparatus for measuring the wavelength of a source of radiant energy which includes passing split beams generated by such source along the same paths as those from a source of known wavelength and then comparing the number of interference fringes developed by the two sources as an element in one common path is varied in its disposition.

10 Claims, 2 Drawing Figures

METHOD OF AND APPARATUS FOR MEASURING THE WAVELENGTH OF A SOURCE OF RADIANT ENERGY

FIELD OF THE INVENTION

The present invention relates to the measurement of wavelengths (frequency) of radiation and more particularly to a method of and apparatus for measuring the wavelength of laser light.

BACKGROUND OF THE INVENTION

Many years ago, Michelson designed and utilized an interferometer which made use of the interference of light beams in terms of a standard length to provide a wavelength measurement. More particularly, as explained in any basic textbook in physics such as, for example, the textbook "Physics" by Hausmann and Slack, second edition, 1939, at pgs. 686ff., a beam of monochromatic light was divided by a beam splitter so as to generate two beams that follow different paths, one path being variable so that upon subsequent recombination of the two beams, if they were in phase, energy addition occured, whereas if the two beams were out of phase, a cancellation of radiant energy occured. If the element utilized to change the length of the one beam path is moved a predetermined distance, a change from the addition to the cancellation of light energy was obtained, indicating by measurement of the distance moved of the wavelength of the light energy. Whereas the technique is extremely successful in general terms, if extremely high frequencies (short wavelengths) are being measured, the accuracy is somewhat limited due to the practical limitation on the measurement of the distance of the moving element. Even with refinements, an accuracy no better than one part in $10^6$ was enabled. Furthermore, even minute vibration of the experimental equipment caused yet additional reduction in the accuracy of the measurement.

SUMMARY OF THE PRESENT INVENTION

Accordingly, it is the general objective of the present invention to provide a method of and apparatus for measuring the wavelength of a source of radiant energy by comparison with a source of known wavelength enabling extreme accuracy approaching one part in $10^9$ to be achieved.

If, for example, the unknown wavelength of a source of laser light or other radiant energy is to be measured, a source of known wavelength is utilized. A beam of energy from the known frequency source is generated and thereafter split as in Michelson's technique so as to form two beams which follow two different paths. The length of one path is varied and the two beams are recombined so that the number of fringes generated by the interference of the two beams with variant path lengths is obtained and can be counted through use of a suitable detector and an associated counter.

In turn, the source of unknown wavelength is arranged to generate a second beam which is split to follow paths common with the paths of the first split beam of known frequency. The two beams from the unknown source are thereafter recombined and the number of fringes are detected and counted resultant from the variance of the path length. Since the ratio of the number of fringes from the first known source and the second unknown source is inversely correlated with the wavelengths of such respective sources, a comparison will provide for an immediate and direct indication of the wavelength of the unknown source.

Since the beams from the known and unknown sources traverse a common path, if any vibration is experienced, both beams are subjected to the same vibration when their paths are varied so that a cancellation of any vibration effects is achieved. However, in accordance with an additional aspect of the invention, the element which effects the variation in the path length preferably takes the form of a corner cube reflector supported on a substantially frictionless support such as an air track thus to minimize vibration, the ultimate result being an accuracy of measurement approaching one part in $10^9$.

If the laser light or other radiant energy of a single (monochromatic) frequency is being measured, the two path lengths of the split beam are not critical in their length but, if one desires to measure incoherent light, a slightly modified embodiment of the invention provides for an equivalence of such path lengths, thus enabling a precise measurement of the wavelengths of the energy from such incoherent source.

BRIEF DESCRIPTION OF THE DRAWING

The stated objective of the invention and the manner in which it is achieved, as summarized hereinabove, will become more apparent from the following detailed description of two embodiments of the present invention as shown in the accompanying drawing whrein.

DETAILED DESCRIPTION OF THE EXEMPLARY EMBODIMENT OF THE INVENTION

Figure 1:
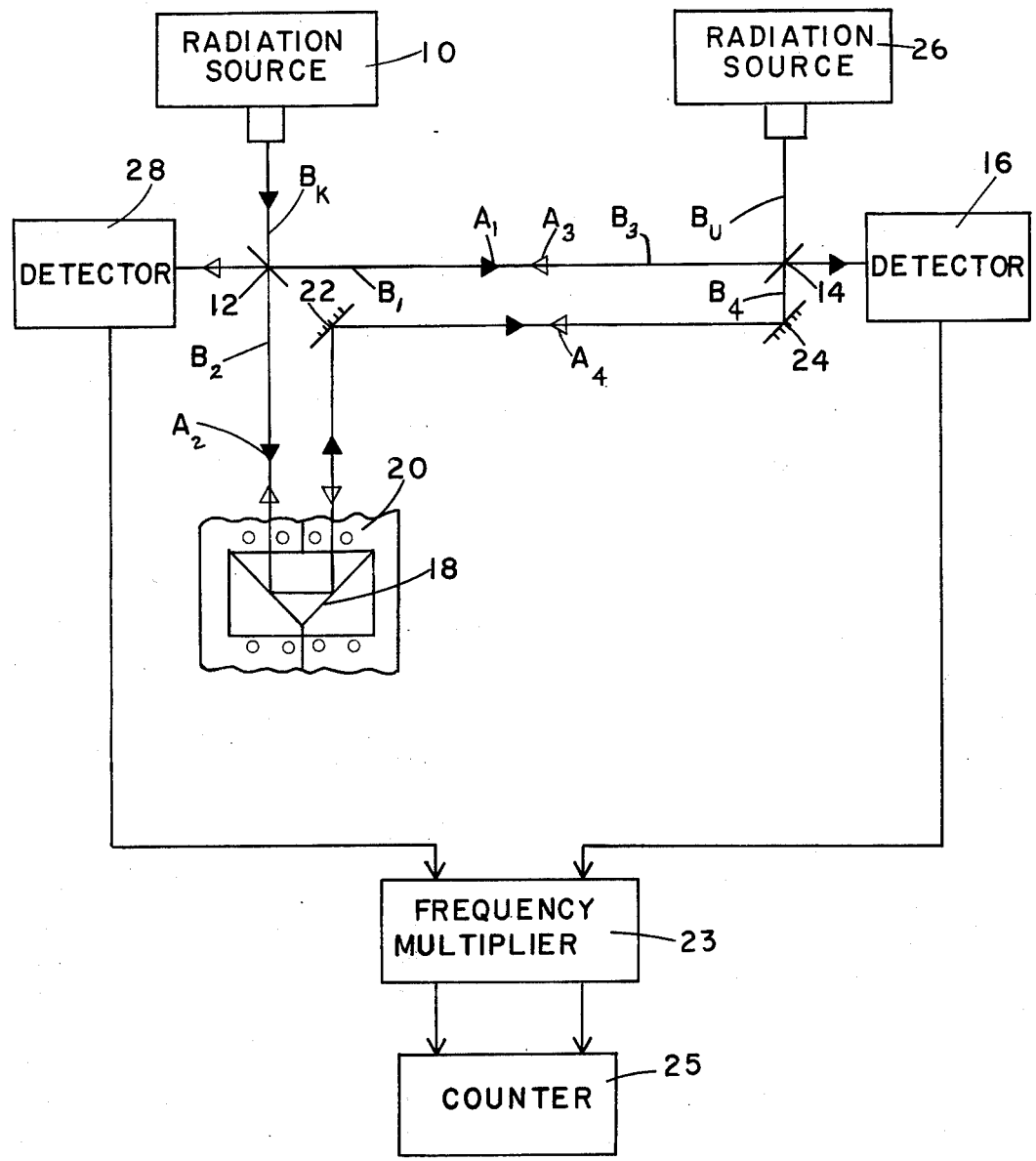
FIG. 1 is a diagrammatic plan view of an interferometer embodying the present invention.

With initial reference to FIG. 1, a source 10 of radiation of known frequency which may be, for example, a continuous wave laser which generates monochromatic energy in the form of a collimated beam $B_k$ is arranged so that such beam will be directed against a beam splitter 12 which may take the form of a half silvered plate disposed at a 45° angle so that two beams $B_1$, $B_2$ are generated, one continuing in the original direction and the other being reflected to travel to the right as shown in FIG. 1, and as indicated by the filled arrows $A_1$, $A_2$, one beam $B_1$ passes through a second beam splitter 14 and directly to a detector 16 in the form of a photodiode or photomultiplier.

The other split beam $B_2$ passes to a corner cube reflector 18 of a conventional variety which however is movably mounted on an air track 20 which in a conventional fashion consists of a V-shaped trough with small apertures therealong through which air may be directed upwardly to provide a substantially frictionless and vibrationless support for the cube reflector. The beam $B_2$ is reflected by the cube reflector 18 and thereafter by two additional mirrors 22,24 so as to arrive at the second beam splitter 14 previously described so that the beams $B_1$, $B_2$ are recombined and directed to the right to the same detector 16.

In accordance with the principles enunciated by Michelson, as the cube reflector 18 is shifted upwardly or downwardly as viewed in FIG. 1, fringes resultant from the interference of the two beams occasioned by the change or variance in path lengths occur, are detected by the detector 16 and delivered preferably to a frequency multiplier 23 whose output is then delivered to a conventional counter 25 which records the number of fringes counted within any given period of time. It should be particularly noted that since the support for the cube reflector 18 is substantially frictionless, the measurement can occur after initial propulsive force to the reflector 18 has been removed so that it coasts along the track 20 freely and thus with minimal vibration.

The radiation source 26 of the unknown frequency to be measured which, in this case, would constitute another continuous wave laser is arranged to direct its bam $B_u$ to the second beam splitter 14 so that it then divides to form split beams $B_3$, $B_4$ indicate by empty arrows $A_3A_4$ along paths common to the arrows $A_1$, $A_2$ followed by the split beams $B_1$, $B_2$ of the known frequency source 10 but in the opposite direction ultimately to be combined and delivered to a second similar detector 28 whose output constituting a number of fringes occasioned by movement of the cube reflector 18 is again delivered to the same frequency multiplier 23 and thence to the counter 25. The ratio of the number of fringes counted of the two separate sources is in inverse proportion to their respective wavelengths so that the wavelength of the unknown source can be immediately determined by the number of counts which can readily be displayed as a digital representation on the counter itself.

Figure 2:
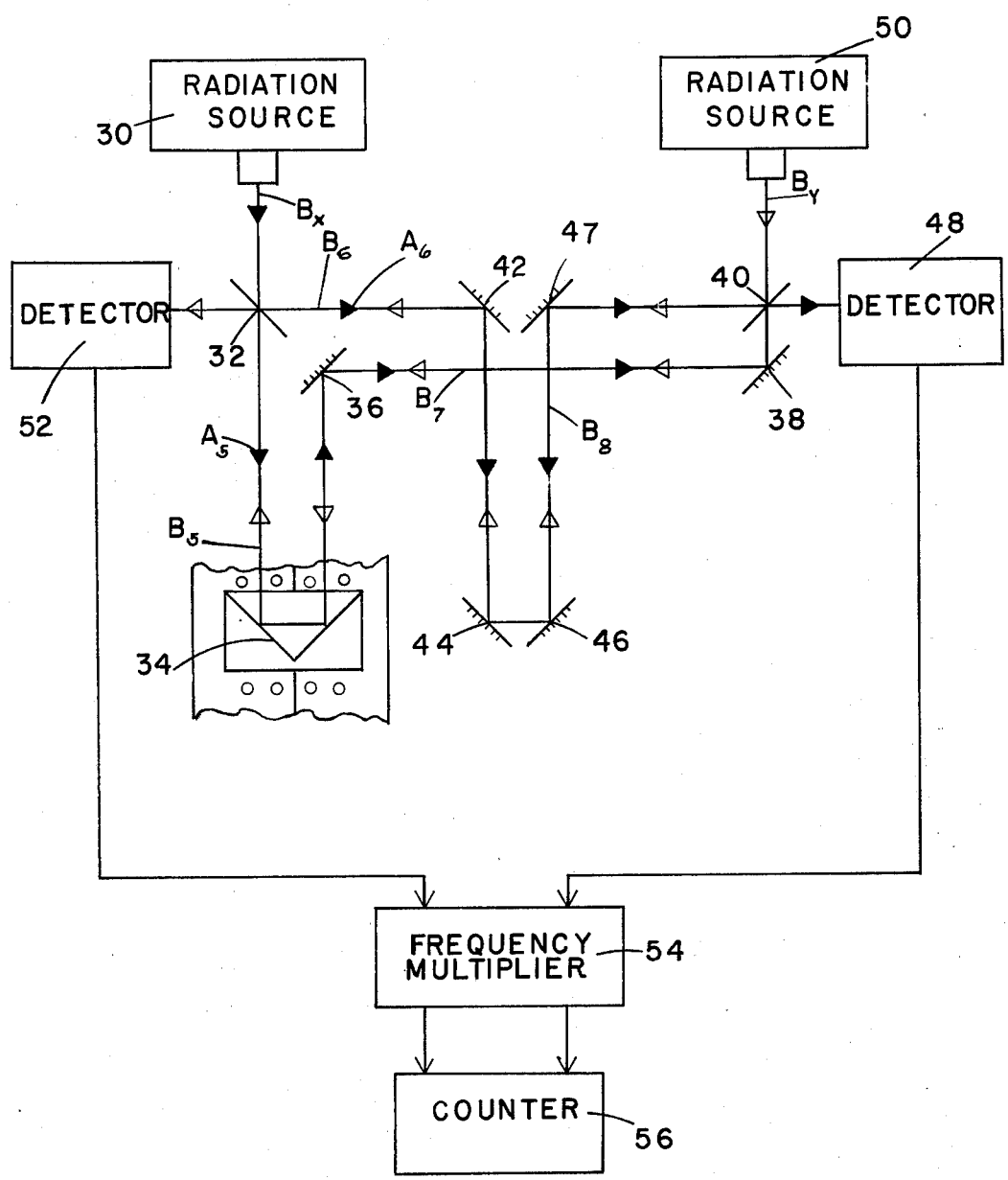
FIG. 2 is a similar diagrammatic plan view of a slightly modified embodiment of the present invention wherein the beams of energy traverse paths of substantially equal length.

It will be apparent that wavelength and/or frequency of radiation sources other than lasers can be determined but if the unknown source is one having incoherent radiation, it is preferred to utilize the arrangement shown in FIG. 2 which basically provides that for a given point or position of a corner cube reflector, there is zero path difference between the beams from the two sources. As shown, the known sources 30 of radiation is directed as a collimated beam $B_x$ to a first beam splitter 32 so that one of the split beams $B_5$ is directed to a corner cube reflector 34 mounted for motion as in the first embodiment of the invention and thence returns along the path as indicated by the filled arrows $A_5$ to a couple of mirrors 36, 38 for ultimate recombination with the second split beam $B_6$ at a second beam splitter 40, such second beam $B_6$ from the first beam splitter passing to a number of mirrors 42, 44, 46, 47 positioned so that the total path length along arrows $A_6$, as illustrated, is precisely the same as that of the first split beam $B_5$. The two recombined beams $B_5$, $B_6$ pass to a detector 48.

In a similar fashion, the radiation source 50 of unknown wavelength is delivered as a beam $B_y$ to the second beam splitter 40 where it divides, one split beam $B_7$ being reflected by the mirrors 36, 38, the corner cube reflector 34, and the beam splitter 32 to a second detector 52, the other split beam $B_8$ passing in the opposite direction along the common path of the beam $B_6$ of the known radiation source to recombine at the beam splitter 32 prior to delivery to the second detector 52.

The detector outputs are again delivered to a frequency multiplier 54 and thence to a counter 56 for ultimate digital display.

In both embodiments of the invention, the utilization of the air track reduces vibration to a nullity but in view of the fact that both the beams from the known and the unknown sources are subjected to the same vibration whatever form it may take, there is a cancellation of the vibratory effects and very precise measurements can take place approaching one part in $10^9$ as previously mentioned.

Various alterations and/or modifications from those in the two described embodiments can be envisioned within the spirit of the invention and the foregoing description accordingly is to be considered as purely exemplary and not in a limiting sense and the actual scope of the invention is to be indicated only by reference to the appended claims.

What is claimed is:

1. The method of measuring the wavelength of radiant energy which comprises the steps of generating a first beam of energy from a source of known frequency, splitting said first beam to form two beams following two different paths, varying the length of one of said paths, recombining said two split bams from said known source, detecting the number of fringes generated by the interference of said two beams as the one path length is varied, generating a second beam from a source of unknown frequency, splitting said second beam to form two beams following two different paths, varying the length of one of said second beam paths an amount corresponding to the variance of the path length of said beam from said known source, recombining said two beams from said unknown source, detecting the number of fringes generated by interference of said two beams from said unknown source as the path lengths are varied, and comparing the number of fringes from the known source and unknown source beams.

2. The method of measuring the wavelength of radiant energy according to claim 1 wherein the paths of said split beams from both sources are common.

3. The method of measuring the wavelength of radiant energy according to claim 2 wherein said split beams pass in opposite directions along said common paths.

4. The method of measuring the wavelength of radiant energy according to claim 1 wherein the path lengths of the split beams from both sources are substantially equal.

5. The method of measuring the wavelength of radiant energy according to claim 1 wherein said beams are composed of monochromatic radiant energy.

6. Apparatus for measuring the wavelength of radiant energy which comprises means for forming a first beam from a source of known frequency, a beam splitter in the path of said first beam to split the same for travel along first and second paths, a movable element disposed in one of said paths to reflect one of split beams, means for recombining said split beams, means for detecting the fringes produced by the beam interference as said movable element is moved, a second beam slitter arranged to receive a second beam from an unknown frequency source so as to split the beam for travel along the same paths but in the opposite direction from the split beams from said known source, means for recombining the split bams from the unknown frequency source, means for detecting the fringes produced by the beam interference as said movable element is moved, and means for comparing the number or fringes from said sources.

7. Apparatus for measuring the wavelength of radiant energy according to claim 6 wherein
said movable element constitutes a corner cube reflector mounted on a substantially frictionless support.

8. Apparatus for measuring the wavelength of radiant energy accoding to claim 7 wherein
said movable element has no exterior propelling force applied thereto during operation of said detecting means.

9. Apparatus for measuring the wavelength of radiant energy according to claim 7 wherein
said substantially frictionless support constitutes an air track.

10. Apparatus for measuring the wavelength of radiant energy according to claim 6 wherein
said beam splitters provide said beam recombining means.

* * * * *